Dec. 28, 1948.    G. J. SHARPS    2,457,323
FISHING REEL
Filed April 20, 1945
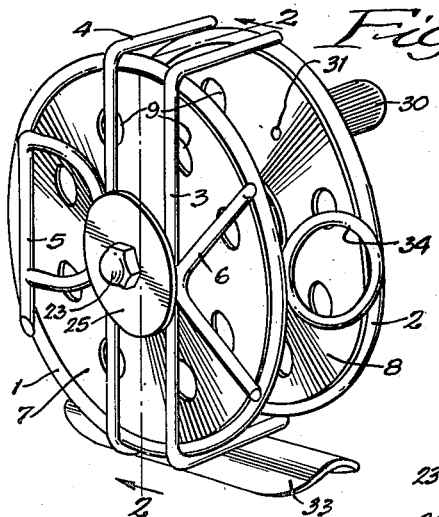
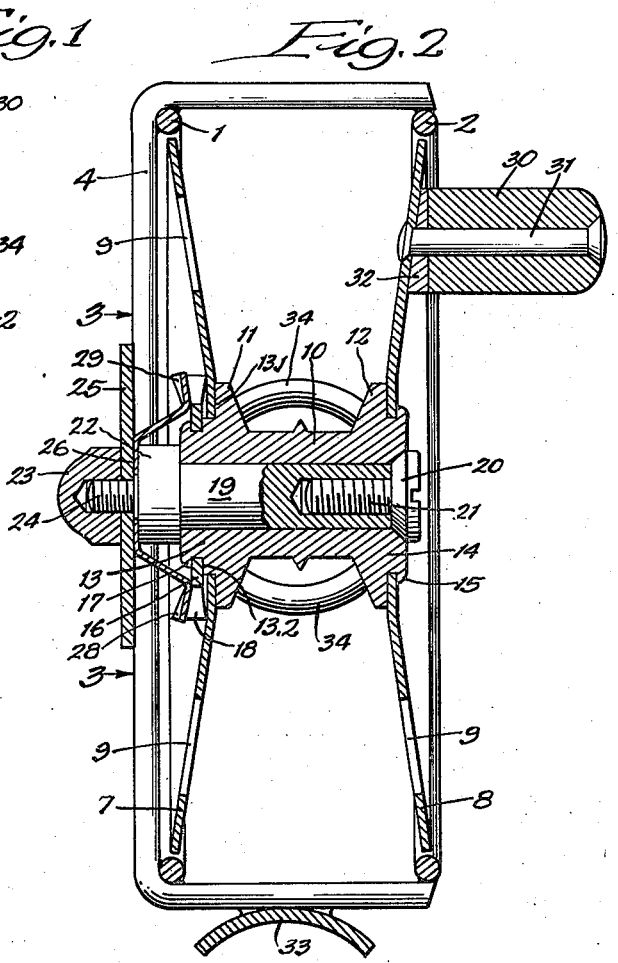
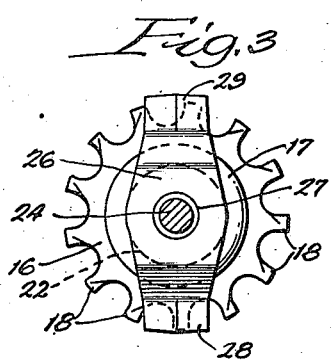
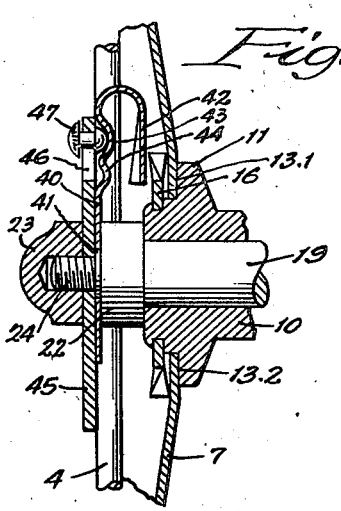
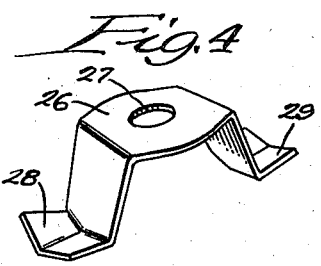
Inventor:
George J. Sharps,
By Kummler Kummler & Davis
Attorneys.

Patented Dec. 28, 1948

2,457,323

UNITED STATES PATENT OFFICE 2,457,323

FISHING REEL

George J. Sharps, Chicago, Ill., assignor to Pachner & Koller, Inc., Chicago, Ill., a corporation of Illinois Application April 20, 1945, Serial No. 589,297

8 Claims. (Cl. 242—84.6)

This invention relates to improvements in fishing reels.

In the past fishing reels have been constructed of die-cast aluminum, plastic or stamped metal casings with complicated gears, pinions, ratchets, pawls incorporated in these expensive casings, etc., all of which tended to make the cost thereof to the fisherman relatively high. It was one of the primary objects of this invention to provide a fishing reel having all of the characteristics and qualities of the high-priced fishing reels incorporated into an improved, light-weight fishing reel which is relatively inexpensive because of the simplified manner of construction as will hereinafter be pointed out.

Other objects of the invention are to provide an improved fishing reel having merely a skeleton frame and a minimum number of parts making up the reel spool and click mechanism, such parts being of extremely simple design; to provide a fishing reel of this character having an improved click mechanism which produces a subdued click when the reel spool is rotated, which is shorter in duration, and having more clicks per revolution without increasing the size of the click gear; to provide a click spring arranged to span the click gear and having a pair of click pawls thereon for coactive engagement with the click gear; to provide a device of this character which is very light in weight, sturdy in construction and having relatively long wearing qualities; to provide a device of this character constructed in such a manner wherein the maximum amount of air is allowed to circulate freely through the fishing line wound around the spool of the reel; and to provide a reel of this character which is so simple in construction that any one can take the same apart and make whatever repairs are necessary and put it together again.

An illustrative embodiment of this invention is shown in the accompanying drawing wherein:

Figure 1 is a perspective view of my invention.

Fig. 2 is a cross sectional view taken on the line 2—2 of Fig. 1.

Fig. 3 is a cross sectional view taken on the line 3—3 of Fig. 2 but with the vertical supporting rod and spool side frame member removed.

Fig. 4 is a perspective view of the click spring.

Fig. 5 is a vertical cross sectional view of a modified form of click spring.

Referring in detail to my preferred embodiment, as shown in the drawing, my reel consists of a framework fabricated out of a pair of steel wires or rods bent and shaped in a form of circle to form parallelly disposed side frames 1 and 2, spaced apart and held in juxtaposition by a pair of C-shaped supporting wires or rods 3 and 4 and depending supporting wires or rods 5 and 6. The side frame members 1 and 2 are welded or otherwise secured to the spacing and rods at all points of contact with each other to form an integral, strong, sturdy structure which is very light in weight.

As will be apparent from Fig. 1, this type of framework readily lends itself to flexibility of design; that is, note that the depending supporting rods 5 and 6 form the letters P and K. These rods may be bent to form substantially all the letters in the alphabet and innumerable designs and configurations and still perform the office of supporting the structure as will be apparent.

The spool 10 comprises a pair of outwardly bowed disks to form side walls 7 and 8, each having a series of perforations 9 therein whereby air may be freely admitted between the walls 7 and 8 so as to materially assist in drying out the fishing line disposed therebetween and prevent mildewing of the same. The spool 10 is also provided with a pair of integrally formed boss-like members or flanges 11 and 12, each having a shouldered hub 13 and 14 to form seats for the side wall disks 7 and 8 respectively. The disks 7 and 8 may be secured to the spool 10 in any suitable manner whereby the disks become an integral part of the spool.

In the drawing I have shown the end of the hub 14, bent outwardly as at 15 to abut against the disk 8 and thereby secure the disk 8 to the flange 12. This may be accomplished by any of the well-known methods, such as by spinning, etc.

The hub 13 is provided with a pair of shoulders 13.1 and 13.2 whereby the disk 7 seats against shoulder 13.1 and the serrated disk or click gear 16 seats against the shoulder 13.2.

It is to be noted from Fig. 2 that the inner face of the click gear 16 snugly abuts against the outer face of the spool side wall 7, whereby they both become an integral part of the spool 10, when the end of the hub 13 is turned up as at 17, and hence both rotate simultaneously with the reel spool upon rotation of the spool.

The click gear 16 is a "13-toothed" lock washer (sometimes referred to as a star washer or a serrated disk) case hardened to give it a long life. Each "tooth" 18 is bent at about a 30° angle to the plane of the face of the washer 16.

The spool 10 is mounted on the shaft 19 and is rotatably held thereon by retaining screw 20 which is threaded into the internally threaded bore 21, the outer end of which is countersunk to form a seat for the beveled inner face of the screw head.

The shaft 19 is provided with an annular shoulder 22 against which the end of hub 13 abuts. The shaft 19 is held stationary in the reel frame by the cap nut 23 which is threaded on the externally threaded end 24 of the shaft 19. A perforated disk, washer or plate 25 is interposed between the frame members 3 and 4 and the cap nut 23 and the disk 25 is welded or otherwise secured to frame members 3 and 4 at points of contact so as to position the shaft axially within the framework.

The click spring 26 is of spring steel and is stamped out or otherwise shaped to the form shown in Fig. 4 and is provided with a centrally positioned perforation 27. Each of the laterally projecting arms 28 and 29 of the click spring 26 is bowed in the manner shown in Fig. 4, i. e., upwardly from the central portion thereof to form a structure which acts as an escapement pawl.

As shown in Fig. 2 the click spring 26 is mounted on the end 24 of shaft 19 between disk 25 and the shoulder 22 and hence is held stationary on the shaft 19.

Fig. 3 shows with particularity the coactive relation between the click spring 26 and click gear 16 to impart a drag to the reel. It is to be noted from Fig. 3 that the click gear is provided with an odd number of teeth 18 and that the pawl 29 will be positioned between two adjacent teeth 18 while pawl 28 will be riding on a tooth which is positioned 180° from the pawl 29. The pawls 28 and 29 are so formed and shaped (see Fig. 4) that the teeth 18 of the click gear 16 will readily ride across the pawls regardless of the direction of rotation of the gear 16.

Upon one complete revolution of the click gear 16, twenty-six distinct subdued "clicks" are created, as will be apparent.

A cylindrical handle grip 30 usually made of wood, plastic or similar material, is secured to the disk 8 by the double-headed pin 31 and the grip 30 is rotatable on the pin 31. In order to compensate for the angle of disk 8 and so that the grip 30 will extend at right-angles to the reel as a whole, I have provided an annular shim 32 having its inner face beveled to the same angle as that of the disk 8. The shim or washer 32 is also carried by the pin 31 but may be integrally secured to the outer face of disk 8 by any suitable means, such as by welding, etc.

My reel also includes a reel seat 33 of the usual type which I secure to the supporting members 3 and 4 by welding, or the like, and medially thereon as shown in Figs. 1 and 2.

I have also found it advisable to further strengthen my reel by securing spacer rings 34 between the members 1 and 2 in the position shown in Figs. 1 and 2. These may be secured in any suitable manner such as by welding them to the members 1 and 2 at their points of contact. It is to be noted that these rings 34 also act as a guide for the fishing line when strung therethrough. Although I have disclosed these supports as rings, it will be apparent that rods or bars may be substituted.

It is to be further noted that the reel as a whole is reversible and hence may be readily used by either a left-handed or right-handed user.

It is also to be noted that with slight modification the click gear and click spring could be reversed so that the click spring would be mounted on the spool 10 and revolve therewith and the click gear would be mounted between the plate 25 and shoulder 22, in the same manner as the click spring is shown in Fig. 2.

It should now be apparent that my fishing reel is exceptionally light in weight and very inexpensive to manufacture. The subdued click generated from rotation of the spool has met with high approval as the clicks are shorter in duration and there are a greater number per revolution. Besides performing the function of imparting a drag on the reel, the click mechanism produces a rhythmic, subdued, tonal click of refined quality, a characteristic looked for by the experienced fisherman as an important feature in a fishing reel.

It will also be apparent that the amount of drag imparted to the reel may be increased or decreased by adjusting the angle of the pawls 28 and 29 with respect to the plane set by the manufacturers.

In fly rod reels, it is important that provision be made to disconnect the clicking mechanism so that the spool will rotate freely without any drag; therefore, in Fig. 5, I have shown a modification of my invention wherein I have incorporated a click spring which may be moved into or out of coactive engagement with the click spring at the will of the operator. Except for this click spring, the reel structure is identical to that of my preferred embodiment.

The spring is preferably of spring steel and consists of an elongated portion 40 having a perforation 41 therein of a diameter sufficient to be threaded into the end 24 of the shaft 19 in the same manner as the spring 26 of the preferred embodiment. The upper end of the spring is bent back upon itself in U-shape, and that portion indicated by the numeral 42 has its side bowed upwardly and outwardly to act as a click pawl in the same manner as does the pawls 28 and 29 of the preferred embodiment.

The portion 40 is also provided with a pair of depressions or seats 43 and 44 therein, the seat 43 however being deeper than the seat 44.

The plate or washer 45 is substantially identical to the plate 25 of the preferred embodiment, but is provided with a short slot 46, in which the button 47 rides. It will be noted that when the button 47 is positioned in the seat 43 the portion 42 of the spring is out of coactive engagement with the click gear 16, but when the button is manually shifted downwardly whereby to be positioned in the shallow slot 44, the entire upper end of the spring will be shifted inwardly, or to the right as viewed in Fig. 5, and the lower end of portion 42 will come in operative coactive engagement with the click gear 16 as will be apparent.

It is to be understood that some of the details shown may be altered or omitted without departing from the spirit of my invention as defined by the following claims.

I claim:

1. In a fishing reel, a skeleton frame; a spool disposed within said frame; a stationary shaft on which said spool is rotatably mounted thereon, said shaft being axially secured to said frame, a click gear integrally secured to said spool, an elongated click spring semi-permanently secured to said shaft and frame, spanning said click gear and having both ends thereof in coactive relationship therewith.

2. The device according to claim 1, wherein the click gear is provided with an odd number of teeth.

3. In a fishing reel, a skeleton frame, a spool disposed within said frame, a stationary shaft, said spool being rotatably mounted on said shaft, said shaft being axially secured to said frame, a click gear, an elongated click spring spanning said click gear and having both ends thereof in coactive relationship therewith.

4. The device according to claim 3, wherein the click gear is provided with an odd number of teeth.

5. In a fishing reel, a casing comprising a pair of annular rings held in juxtaposition by spaced supporting members, a spool having outwardly bowed perforated side walls, a shaft having an annular shoulder thereon, said spool being rotatably mounted on said shaft, supporting means positioned across the periphery of one of said rings, anchorage means secured to said supporting means, having a centrally located perforation therein, means for removably securing one end of said shaft to said anchorage means, a shoulder on said spool, a click gear arranged on said spool and semi-permanently secured thereto against said shoulder to be rotatable with said spool, the teeth of said click gear being all angularly disposed in one direction to the plane of said gear face, a click spring having a pair of integral click pawls on the distal ends thereof, said spring being anchored medially on said shaft between said shaft shoulder and said anchorage means and securely held thereagainst to prevent rotation thereof, said click spring adapted to span said click gear, and said pawls being in coactive engagement with the teeth thereof, and means to rotate said spool.

6. The device according to claim 5 wherein the click gear is provided with an odd number of teeth.

7. In a fishing reel, a casing comprising a pair of annular rings held in juxtaposition by spaced supporting members, a spool having outwardly bowed perforated side walls, a shaft having an annular shoulder thereon, said spool being rotatably mounted on said shaft, a spider subtended in the area within the periphery of one of said rings, means secured to said spider having a centrally located perforation therein, means for removably securing one end of said shaft to said first-mentioned means, a shoulder on said spool, a click gear, the teeth of said click gear being all angularly disposed in one direction to the plane of said gear face, a click spring having a pair of integrally formed click pawls on the distal ends thereof, said click spring adapted to span said click gear and said pawls having coactive engagement therewith, and means to rotate said spool.

8. The device according to claim 7 wherein the click gear is provided with an odd number of teeth.

GEORGE J. SHARPS.

REFERENCES CITED

The following references are of record in the file of this patent:

UNITED STATES PATENTS

| Number | Name | Date |
|---|---|---|
| 728,717 | Hunter | May 19, 1903 |
| 778,368 | Meisselbach et al. | Dec. 27, 1904 |
| 1,398,189 | Hodges et al. | Nov. 22, 1921 |
| 1,407,537 | Hodges et al. | Feb. 21, 1922 |
| 1,871,386 | Pflueger | Aug. 9, 1932 |
| 2,158,597 | Watson | May 16, 1939 |
| 2,191,004 | Whitcomb | Feb. 20, 1940 |